United States Patent
Wu

(10) Patent No.: US 8,599,270 B2
(45) Date of Patent: Dec. 3, 2013

(54) COMPUTING DEVICE, STORAGE MEDIUM AND METHOD FOR IDENTIFYING DIFFERENCES BETWEEN TWO IMAGES

(75) Inventor: Wen-Wu Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/443,878

(22) Filed: Apr. 10, 2012

(65) Prior Publication Data

US 2012/0320223 A1 Dec. 20, 2012

(30) Foreign Application Priority Data

Jun. 15, 2011 (CN) .......................... 2011 1 0160461

(51) Int. Cl.
*H04N 5/225* (2006.01)
*H04N 5/76* (2006.01)

(52) U.S. Cl.
USPC ................ 348/207.1; 348/207.11; 348/218.1; 348/231.6

(58) Field of Classification Search
USPC ................. 348/207.1, 207.11, 218.1, 231.6
See application file for complete search history.

(56) References Cited

U.S. PATENT DOCUMENTS

| | | | |
|---|---|---|---|
| 2009/0097697 A1* | 4/2009 | Miyake | 382/100 |
| 2010/0073466 A1* | 3/2010 | Jones et al. | 348/51 |
| 2011/0043628 A1* | 2/2011 | Yun | 348/143 |

* cited by examiner

*Primary Examiner* — James Hannett
*Assistant Examiner* — Padma Haliyur
(74) *Attorney, Agent, or Firm* — Altis & Wispro Law Group, Inc.

(57) ABSTRACT

In a method for identifying differences between two images using a computing device, a digital image of the object is captured using an image capturing device, and a standard image of the object is obtained from a storage system of the computing device. A threshold value is generated according to pixel values of the digital image and the standard image. The method extracts first feature points from the digital image and second feature points from the second gray picture according to the threshold value. The method further determines a first feature area of the first gray picture according to the first feature points, determines a second feature area of the second gray picture according to the second feature points, and compares the first feature area with the second feature area to identify a difference between the digital image and the standard image.

19 Claims, 3 Drawing Sheets

COMPUTING DEVICE, STORAGE MEDIUM AND METHOD FOR IDENTIFYING DIFFERENCES BETWEEN TWO IMAGES

BACKGROUND

1. Technical Field

Embodiments of the present disclosure relate to image processing systems and methods, and particularly to a computing device, a storage medium, and a method for identifying differences between two images an object to be measured.

2. Description of Related Art

Users often perform multiple operations on images captured by an image capturing device (e.g., a typical digital camera) such as to identify differences between the captured images. A common practice is to pre-set image optimization parameters for improving the quality of images captured by the digital camera. Each of the captured images is analyzed to obtain a difference of the two captured images, such as the difference of brightness, contrast, and uniformity of the two captured images. However, such operation cannot precisely identify the image differences in the levels of light overall, or anomalies caused by reflections of light, which are also critical to image quality.

Therefore, an improved image comparison system and method are desirable to precisely identifying differences between two images of an object to be measured.

DETAILED DESCRIPTION

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
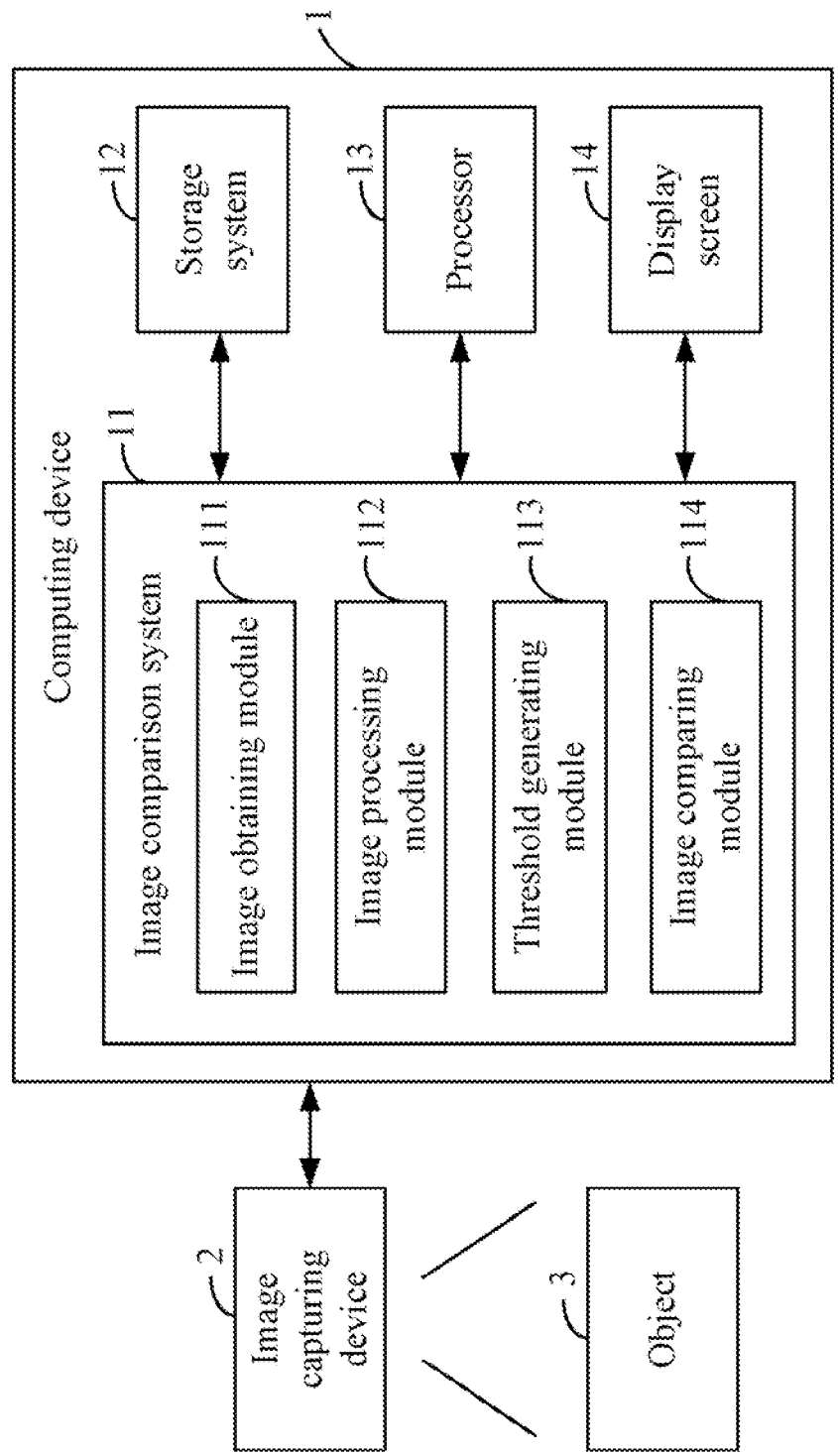
FIG. 1 is a block diagram of one embodiment of a computing device including an image comparison system.
Figure 3:
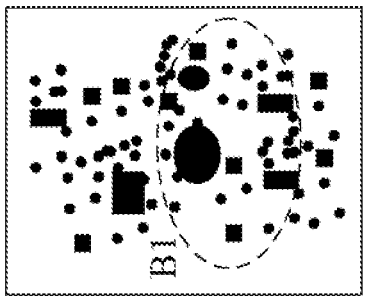
FIG. 3 is a schematic diagram illustrating one example of a digital image and a standard image of an object.
Figure 3:
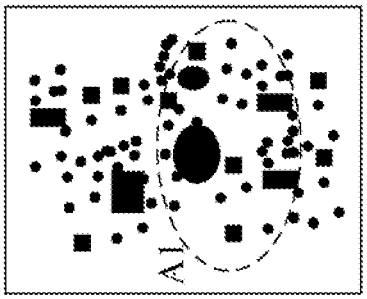

FIG. 1 is a block diagram of one embodiment of a computing device 1 including an image comparison system 11. In the embodiment, the computing device 1 connects to an image capturing device 2, such as a digital camera, for example. The image capturing device 2 captures a digital image (e.g., the digital image "A" as shown in FIG. 3) of an object 3, such as a motherboard of a computer, for example. The computing device 1 may further include a storage system 12, at least one processor 13, and a display screen 14. It is understood that FIG. 1 is only one example of the computing device 1 that includes more or fewer components than those shown in the embodiment, or have a different configuration of the various components.

The image comparison system 11 compares the digital image and a standard image (e.g., the standard image "B" as shown in FIG. 3) of the object 3 to precisely identify differences of the two images, and displays the difference of the two images on the display screen 14. In the embodiment, the standard image is defined as a reference image of the object 3 having a determined level of brightness and contrast.

The storage system 12 stores the standard image of the object 3, and one or more computer programs of the image comparison system 11. In one embodiment, the storage system 12 may be an internal storage system, such as a random access memory (RAM) for temporary storage of information, and/or a read only memory (ROM) for permanent storage of information. In some embodiments, the storage system 12 may also be an external storage system, such as an external hard disk, a storage card, or a data storage medium.

In one embodiment, the image comparison system 11 includes an image obtaining module 111, an image processing module 112, a threshold generating module 113, and an image comparing module 114. The modules 111-114 may comprise computerized instructions in the form of one or more programs that are stored in the storage system 12, and executed by the at least one processor 13 to provide functions for comparing the digital image and the standard image of the object 3 to precisely find differences of the two images. A detailed description of each module will be given in the following paragraphs.

Figure 2:
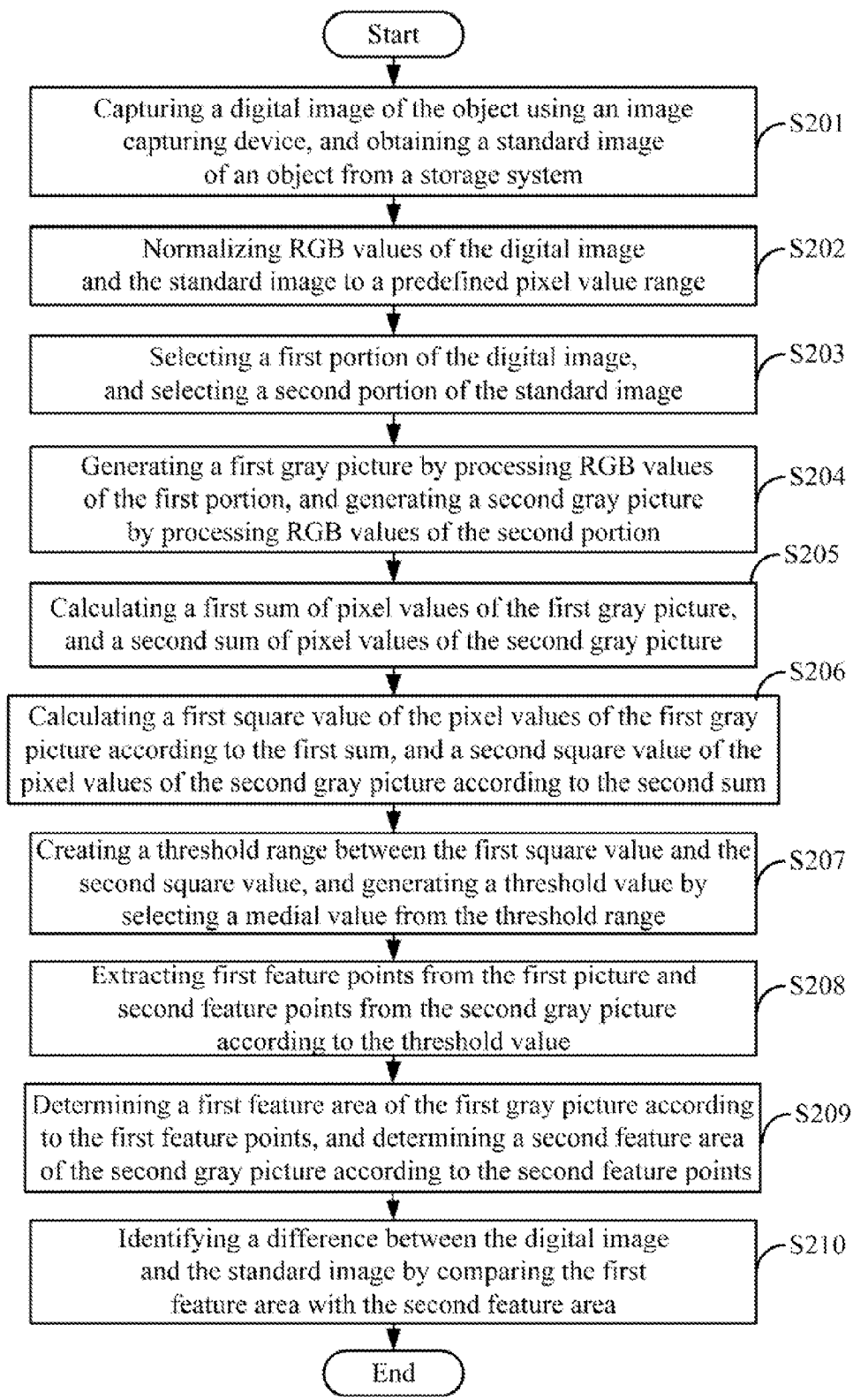
FIG. 2 is a flowchart of one embodiment of a method for identifying differences between two images of an object using the computing device of FIG. 1.

FIG. 2 is a flowchart of one embodiment of a method for identifying differences between two images of an object using the computing device 1 of FIG. 1. In the embodiment, the method can compare the two images of the object 3 to precisely find differences between the two images, and displays the differences on the display screen 14. Depending on the embodiment, additional blocks may be added, others removed, and the ordering of the blocks may be changed.

In block S201, the image obtaining module 111 captures a digital image of the object 3 using the image capturing device 2, and obtains a standard image of the object 3 from the storage system 12. As shown in FIG. 3, the digital image "A" may be different from the standard image "B", since the digital image "A" is captured from the object 3 that may be influenced by reflection of a surrounding light or the level changes of the surrounding light.

In block S202, the image processing module 112 normalizes RGB (red, green, blue) values of the digital image and the standard image to a predefined pixel value range. In one embodiment, the pixel value range is predefined as a range of pixel values 0 and 255 (denoted as [0, 255]). The RGB values include a R value, a G value and a B value, and each of the RGB values may be within pixel value range [0, 255]. For example, the R value may be within a range of pixel values 100 and 150 (denoted as [100, 150]), the G value may be within a range of pixel value 80 and 160 (denoted as [90, 130]), and the B value may be within a range of pixel value 80 and 160 (denoted as [80, 160]).

In block S203, the image processing module 112 selects a first portion of the digital image, and selects a second portion of the standard image. Referring to FIG. 3, the image processing module may select the first portion "P1" from the digital image "A," and selects the first portion "P2" from the digital image "B."

In block S204, the image processing module 112 generates a first gray picture by processing RGB values of the first portion, and generates a second gray picture by processing RGB values of the second portion. In one embodiment, the image processing module 122 calculates a gray value of each of the RGB values of the first portion according to a calculation equation: Gray=(R*299+G*587+B*114)/1000, and replaces the RGB values (R, G, B) with the gray values (G1, G2, G3) to generate the first gray picture. The image processing module 122 calculates a gray value of each of the RGB values of the second portion according to the identical formula, and replaces the RGB values (R, G, B) with the gray values (G1, G2, G3) to generate the second gray picture.

In block S205, the threshold generating module 113 calculates a first sum of all pixel values of the first gray picture, and calculates a second sum of all pixel values of the second gray picture. In one embodiment, the first gray picture has N numbers of pixel points, and the second gray picture has M numbers of pixel points. Threshold generating module adds all pixel values of the N numbers of pixel points to obtain the first sum S1 of the first gray picture, and adds all pixel values of the M numbers of pixel points to obtain the second sum S2 of the second gray picture.

In block S206, the threshold generating module 113 calculates a first square value of all pixel values of the first gray picture according to the first sum and a total number of pixel points of the first gray picture, and calculates a second square value of all pixel values of the second gray picture according to the second sum and a total number of pixel points of the second gray picture. In one embodiment, threshold generating module 113 divides the first sum S1 with the N numbers of pixel points of the first gray picture to obtain the first square value Q1, and divides the second sum S2 with the M numbers of pixel points of the second gray picture to obtain the second square value Q2.

In block S207, the threshold generating module 113 creates a threshold range between the first square value and the second square value, and generates a threshold value by selecting a medial value from the threshold range. In one embodiment, the threshold range is created as [Q1, Q2] according to the first square value Q1 and the second square value Q2, and the threshold generating module 113 regards the medial value of the threshold range as the threshold value $T=(Q1+Q2)/2$.

In block S208, the image comparing module 114 extracts a plurality of first feature points from the first picture according to the threshold value, and extracts a plurality of second feature points from the second gray picture according to the threshold value. In one embodiment, each of the first feature points is a pixel point of the first picture, and each of the second feature points is a pixel point of the second picture. Each of the pixel points of the first gray picture and the second gray picture has a pixel value that is presented by the RGB value. The image comparing module 114 extracts pixel points whose each pixel value is greater than the threshold value T from the first picture as the first feature points, and extracts pixel points whose each pixel value is greater than the threshold value T from the second picture as the second feature points.

In block S209, the image comparing module 114 determines a first feature area of the first gray picture according to the first feature points, and determines a second feature area of the second gray picture according to the second feature points. In one embodiment, the image comparing module 114 builds a feature matrix according to a relationship between each of the first feature points and the second feature points, determines the first feature area from the first gray picture based on the feature matrix, and determines the second feature area from the second gray picture based on the feature matrix. Referring to FIG. 3, the image comparing module 114 determines an area "A1" whose feature points is more than other areas from the first gray picture "P1" as the first feature area, and determines an area "B1" whose feature points is more than other areas from the second gray picture "P2" as the second feature area.

In block S210, the image comparing module 114 identifies a difference between the digital image and the standard image by comparing the first feature area with the second feature area, and displays the difference between the digital image and the standard image on the display screen 14.

All of the processes described above may be embodied in, and fully automated via, functional code modules executed by one or more general purpose processors of computing devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, the computing device connected to an image capturing device, the computing device comprising:
   a storage system;
   at least one processor; and
   one or more programs stored in the storage system and executable by the at least one processor, the one or more programs comprising:
   an image obtaining module that captures a digital image of an object using the image capturing device, and obtains a standard image of the object from the storage system, wherein the standard image is stored in the storage system and is a reference image of the object having a determined level of brightness and contrast;
   an image processing module that selects a first portion of the digital image and selects a second portion of the standard image, generates a first gray picture by calculating gray values of the first portion and replacing RGB values of the first portion with the gray values of the first portion, and generates a second gray picture by calculating gray values of the second portion and replacing RGB values of the second portion with the gray values of the second portion;
   an threshold generating module that calculates a first square value of all pixel values of the first gray picture and a second square value of all pixel values of the second gray picture, creates a threshold range between the first square value and the second square value, and generates a threshold value by selecting a medial value from the threshold range; and
   an image comparing module that extracts a plurality of first feature points from the first picture according to the threshold value, extracts a plurality of second feature points from the second gray picture according to the threshold value, determines a first feature area of the first gray picture according to the first feature points, determines a second feature area of the second gray picture according to the second feature points, and identifies a difference between the digital image and the standard image by comparing the first feature area with the second feature area.

2. The computing device according to claim 1, wherein the image processing module further normalizes RGB values of the digital image and RGB values of the standard image to a predefined pixel value range.

3. The computing device according to claim 1, wherein the threshold generating module further calculates a first sum of all pixel values of the first gray picture and a second sum of all pixel values of the second gray picture.

4. The computing device according to claim 3, wherein the first square value of all pixel values of the first gray picture is calculated according to the first sum and a total number of pixel points of the first gray picture, and the second square value of all pixel values of the second gray picture is calculated according to the second sum and a total number of pixel points of the second gray picture.

5. The computing device according to claim 1, wherein the pixel value of each of the first feature points is greater than the threshold value, and the pixel value of each of the second feature points is greater than the threshold value.

6. The computing device according to claim 1, wherein the image comparing module constructs a feature matrix according to a relationship between each of the first feature points and each of the second feature points, determines the first feature area from the first gray picture based on the feature matrix, and determines the second feature area from the second gray picture based on the feature matrix.

7. The computing device according to claim 1, wherein the image comparing module further displays the difference between the digital image and the standard image on a display screen of the computing device.

8. A computerized method for identifying differences between two images of an object using a computing device, the computing device connected to an image capturing device, the method comprising:
   capturing a digital image of the object using the image capturing device, and obtaining a standard image of the object from a storage system of the computing device, wherein the standard image is stored in the storage system and is a reference image of the object having a determined level of brightness and contrast;
   selecting a first portion of the digital image, and selecting a second portion of the standard image;
   generating a first gray picture by calculating gray values of the first portion and replacing RGB values of the first portion with the gray values of the first portion, and generating a second gray picture by calculating gray values of the second portion and replacing RGB values of the second portion with the gray values of the second portion;
   calculating a first square value of all pixel values of the first gray picture and a second square value of all pixel values of the second gray picture;
   creating a threshold range between the first square value and the second square value, and generating a threshold value by selecting a medial value from the threshold range;
   extracting a plurality of first feature points from the first picture according to the threshold value, and extracting a plurality of second feature points from the second gray picture according to the threshold value;
   determining a first feature area of the first gray picture according to the first feature points, and determining a second feature area of the second gray picture according to the second feature points;
   identifying a difference between the digital image and the standard image by comparing the first feature area with the second feature area; and
   displaying the difference between the digital image and the standard image on a display screen of the computing device.

9. The method according to claim 8, further comprising:
   normalizing RGB values of the digital image and RGB values of the standard image to a predefined pixel value range.

10. The method according to claim 8, further comprising:
    calculating a first sum of all pixel values of the first gray picture and a second sum of all pixel values of the second gray picture.

11. The method according to claim 10, wherein the first square value of all pixel values of the first gray picture is calculated according to the first sum and a total number of pixel points of the first gray picture, and the second square value of all pixel values of the second gray picture is calculated according to the second sum and a total number of pixel points of the second gray picture.

12. The method according to claim 8, wherein the pixel value of each of the first feature points is greater than the threshold value, and the pixel value of each of the second feature points is greater than the threshold value.

13. The method according to claim 8, wherein the first feature area and the second feature area are determined by:
    constructing a feature matrix according to a relationship between each of the first feature points and each of the second feature points;
    determining the first feature area from the first gray picture based on the feature matrix; and
    determining the second feature area from the second gray picture based on the feature matrix.

14. A non-transitory computer-readable medium having stored thereon instructions that, when executed by at least one processor of a computing device, causes the computer to perform a method for identifying differences between two images of an object, the computing device connected to an image capturing device, the method comprising:
    capturing a digital image of the object using the image capturing device, and obtaining a standard image of the object from a storage system of the computing device, wherein the standard image is stored in the storage system and is a reference image of the object having a determined level of brightness and contrast;
    selecting a first portion of the digital image, and selecting a second portion of the standard image;
    generating a first gray picture by calculating gray values of the first portion and replacing RGB values of the first portion with the gray values of the first portion, and generating a second gray picture by calculating gray values of the second portion and replacing RGB values of the second portion with the gray values of the second portion;
    calculating a first square value of all pixel values of the first gray picture and a second square value of all pixel values of the second gray picture;
    creating a threshold range between the first square value and the second square value, and generating a threshold value by selecting a medial value from the threshold range;
    extracting a plurality of first feature points from the first picture according to the threshold value, and extracting a plurality of second feature points from the second gray picture according to the threshold value;
    determining a first feature area of the first gray picture according to the first feature points, and determining a second feature area of the second gray picture according to the second feature points;
    identifying a difference between the digital image and the standard image by comparing the first feature area with the second feature area; and displaying the difference between the digital image and the standard image on a display screen of the computing device.

15. The medium according to claim 14, wherein the method further comprises:
  normalizing RGB values of the digital image and RGB values of the standard image to a predefined pixel value range.

16. The medium according to claim 14, wherein the method further comprises:
  calculating a first sum of all pixel values of the first gray picture and a second sum of all pixel values of the second gray picture.

17. The medium according to claim 16, wherein the first square value of all pixel values of the first gray picture is calculated according to the first sum and a total number of pixel points of the first gray picture, and the second square value of all pixel values of the second gray picture is calculated according to the second sum and a total number of pixel points of the second gray picture.

18. The medium according to claim 14, wherein the pixel value of each of the first feature points is greater than the threshold value, and the pixel value of each of the second feature points is greater than the threshold value.

19. The medium according to claim 14, wherein the first feature area and the second feature area are determined by:
  constructing a feature matrix according to a relationship between each of the first feature points and each of the second feature points;
  determining the first feature area from the first gray picture based on the feature matrix; and
  determining the second feature area from the second gray picture based on the feature matrix.

* * * * *